United States Patent
Enevoldsen et al.

(10) Patent No.: US 10,364,801 B2
(45) Date of Patent: Jul. 30, 2019

(54) REDUCING THE LOAD OF A WIND TURBINE ROTOR BLADE DURING INSTALLATION

(71) Applicant: Siemens Aktiengesellschaft, München (DK)

(72) Inventors: Peder Bay Enevoldsen, Vejle (DK); Alejandro Gomez Gonzalez, Aarhus (DK)

(73) Assignee: SIEMENS GAMESA RENEWABLE ENERGY A/S (DK)

( * ) Notice: Subject to any disclaimer, the term of this patent is extended or adjusted under 35 U.S.C. 154(b) by 325 days.

(21) Appl. No.: 15/370,855

(22) Filed: Dec. 6, 2016

(65) Prior Publication Data
US 2017/0284362 A1    Oct. 5, 2017

(30) Foreign Application Priority Data
Mar. 31, 2016  (EP) .................... 16163228

(51) Int. Cl.
*F03D 1/06*       (2006.01)
*F03D 13/10*      (2016.01)
(Continued)

(52) U.S. Cl.
CPC ........... *F03D 13/10* (2016.05); *F03D 1/0633* (2013.01); *F03D 1/0658* (2013.01);
(Continued)

(58) Field of Classification Search
CPC ........ F03D 1/00; F03D 1/0675; F03D 1/0633; F03D 7/0296; F03D 7/0232; F03D 13/00; F03D 13/10; F03D 13/20; F03D 13/40
See application file for complete search history.

(56) References Cited

U.S. PATENT DOCUMENTS

2013/0323007 A1* 12/2013 Falkenberg ............ A45C 11/00
                                                              414/815
2015/0037112 A1    2/2015 Nagabhushana et al.
(Continued)

FOREIGN PATENT DOCUMENTS

DE       202009002054 U1     6/2009
EP          2418376 A1       2/2012
(Continued)

OTHER PUBLICATIONS

Extended European Search Report for EP Application No. 16163228.6, dated Sep. 8, 2016.
(Continued)

*Primary Examiner* — Jacob M Amick
(74) *Attorney, Agent, or Firm* — Schmeiser, Olsen & Watts, LLP

(57) ABSTRACT

A method of reducing the load of a rotor blade of a wind turbine during installation of the wind turbine, whereby the rotor blade includes an aerodynamic device such as a vortex generator or a noise reducer is provided. The method includes the steps of attaching a cover on the rotor blade for covering at least a part of the aerodynamic device before lifting the rotor blade to the top of the tower of the wind turbine, and detaching the cover subsequently. An arrangement including a rotor blade of a wind turbine and such a cover, is also provided.

18 Claims, 7 Drawing Sheets

(51) Int. Cl.
*F03D 13/40* (2016.01)
*F03D 7/02* (2006.01)

(52) U.S. Cl.
CPC ......... *F03D 1/0675* (2013.01); *F03D 7/0232* (2013.01); *F03D 7/0296* (2013.01); *F03D 13/40* (2016.05); *F05B 2240/21* (2013.01); *F05B 2250/14* (2013.01); *F05B 2250/711* (2013.01); *F05B 2260/96* (2013.01); *Y02E 10/721* (2013.01)

(56) References Cited

U.S. PATENT DOCUMENTS

| | | | |
|---|---|---|---|
| 2015/0275855 A1 | 10/2015 | Pal et al. | |
| 2015/0329036 A1* | 11/2015 | Johnson | B60P 3/40 410/46 |
| 2017/0370386 A1* | 12/2017 | Wardropper | F03D 80/00 |

FOREIGN PATENT DOCUMENTS

| | | |
|---|---|---|
| EP | 2669238 A1 | 12/2013 |
| GB | 2475865 A | 6/2011 |
| WO | 2010147480 A1 | 12/2010 |

OTHER PUBLICATIONS

Non-English Chinese Office Action for application No. 201710207451.6 dated Oct. 23, 2018.

\* cited by examiner

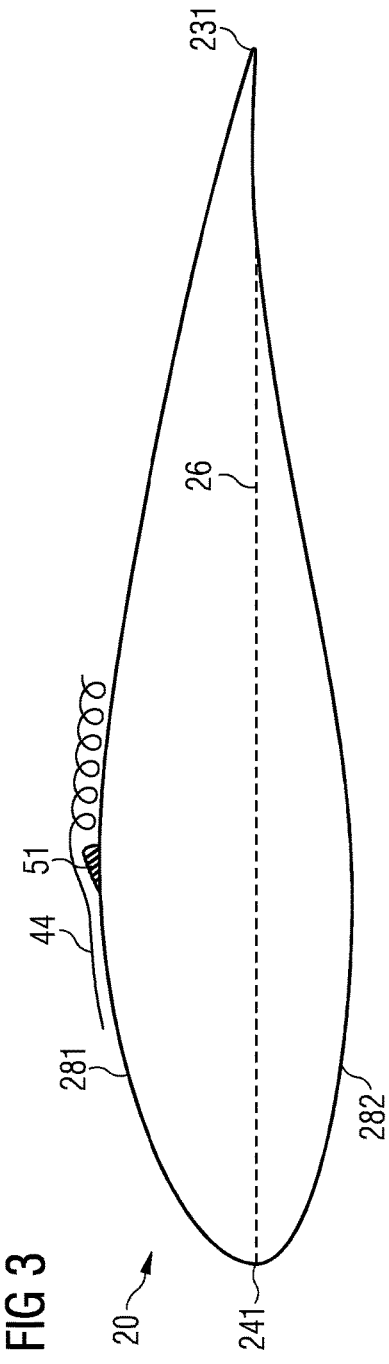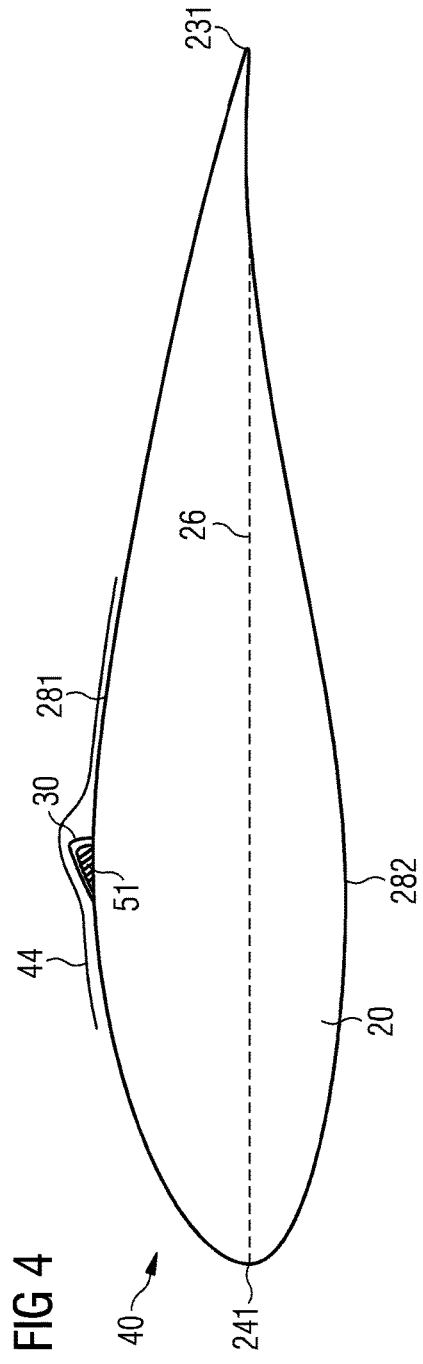

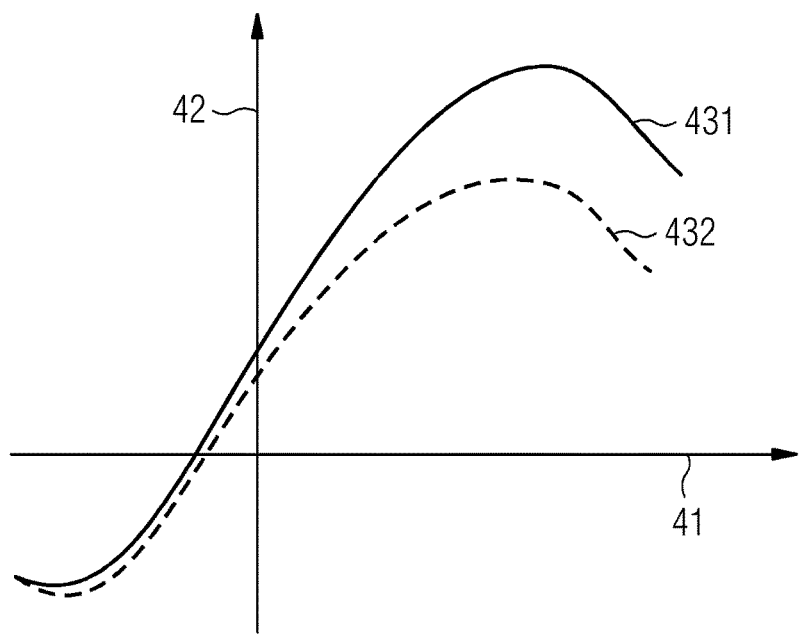

REDUCING THE LOAD OF A WIND TURBINE ROTOR BLADE DURING INSTALLATION

CROSS-REFERENCE TO RELATED APPLICATIONS

This application claims priority to European Application No. EP 16163228.8, having a filing date of Mar. 31, 2016, the entire contents of which are hereby incorporated by reference.

FIELD OF TECHNOLOGY

The following relates to a method of reducing the load of a rotor blade of a wind turbine during installation of the wind turbine. Furthermore, the following relates to an arrangement comprising a rotor blade of a wind turbine and a cover.

BACKGROUND

During installation of a wind turbine, the maximum wind speed at which installation of the wind turbine can be carried out is a key parameter. This is particularly true for the offshore installation of a wind turbine. Offshore, a steady wind flow at an elevated level is typical. This elevated level of steady wind flow together with sporadically occurring gusts often lead to the situation that installation of a wind turbine cannot be carried out. This is a challenge, in particular as each day where installation of the wind turbine offshore has to be postponed is very expensive. Therefore, there is the general strive for enabling and ensuring installation of a wind turbine also at elevated wind speeds.

One approach of reducing the drag of a rotor blade of a wind turbine during installation has been proposed in the European patent application EP 2 669 238 A1. Therein, the drag coefficient of the rotor blade is generally reduced by covering the entire rotor blade. However, this approach has some disadvantages such as it may involve considerable costs to envelope the rotor blade entirely with the cover and to adapt the cover to the lifting device which is used for lifting the blade.

Therefore, there exists the desire to provide an alternative method to enable installation of a wind turbine even at elevated wind speeds.

This problem is solved by the subject matter of the independent claims. Advantageous modifications and embodiments are disclosed in the dependent claims.

SUMMARY

An aspect relates to providing a method of reducing the load of a rotor blade of a wind turbine during installation of the wind turbine. The rotor blade comprises an aerodynamic device, in particular a vortex generator or a noise reducer or a flap, which is arranged at the surface of the rotor blade. The method comprises the steps of attaching the cover on the rotor blade such that at least a part of the aerodynamic device is covered by the cover; lifting the rotor blade to the top of the tower of the wind turbine; and detaching the cover from the rotor blade.

A key aspect of embodiments of the present invention is that the aerodynamic devices, which are configured to provide additional lift of the rotor blade in certain operational modes of the wind turbine, are at least partly "neutralized" by a cover. This means that the effect of increasing the lift, which is desired during certain operational modes of the wind turbine and which may be undesired and harmful during installation of the wind turbine, is at least mitigated or even completely eliminated. Covering, i.e. neutralizing, these aerodynamic devices has the advantage that the load on the rotor blade and other components of the wind turbine is reduced. This is due to the fact that the lift of the rotor blade is correlated with the load that is experienced by the rotor blade and other components of the wind turbine. Therefore, by covering and "switching off" these aerodynamic devices, the lift that is generated by these aerodynamic devices is reduced, which implies that the load being experienced by the rotor blade is reduced.

Another advantage of covering these aerodynamic devices during installation of the wind turbine is that the aerodynamic device is covered and protected against damages.

For instance, the aerodynamic device is a vortex generator or a noise reducer, such as a serrated trailing edge. The aerodynamic device may also be a flap for modifying the lift coefficient of the rotor blade, such as a Gurney flap. Note that a serrated trailing edge may both act as a noise reducer and as a lift modifying device. A vortex generator, a noise reducer or a flap typically is a thin and fragile component, which is particularly exposed to the treatment of the rotor blade during handling and lifting of the rotor blade. Therefore, by covering and protecting these aerodynamic devices, not only the lift of the rotor blade is reduced but also the rotor blade as such is less prone to damages during transportation and lifting. Consequently, handling of the rotor blade is facilitated.

The aerodynamic device is arranged at a surface of the rotor blade. Examples of areas which form part of the surface of the rotor blade is the pressure side and the suction side of the rotor blade. The pressure side is defined as the part of the surface which extends between the leading edge and the trailing edge of the rotor blade on one side. The area between the leading edge and the trailing edge on the other side of the rotor blade is referred to as the suction side of the rotor blade. In other words, the aerodynamic device such as e.g. the vortex generator or the noise reducer may either be attached and mounted to the pressure side and/or to the suction side of the rotor blade.

The cover may be attached to the aerodynamic device itself or to the surface of the rotor blade which is surrounding the aerodynamic device. Given the fact that the aerodynamic devices often are fragile parts, it may be advantageous to attach the cover at the surface area around the aerodynamic device instead of at the aerodynamic device itself.

Furthermore, the cover may cover the aerodynamic device partly or completely.

Regarding the lifting process, the rotor blade is typically lifted from the ground until the top of the tower in the case of onshore installation of the wind turbine. In the case of offshore installation of the wind turbine, the rotor blade is typically lifted from a vessel to the top of the tower.

Note that rotor blades may be lifted one by one, i.e. one rotor blade after the other is lifted and mounted to the hub of the wind turbine, which is already arranged and connected with the nacelle on top of the tower. This approach is also referred to as single blade mounting.

There also exists the approach of first mounting the rotor blades, in particular all three rotor blades, to the hub at the ground and then, subsequently, lifting the whole ensemble comprising the several rotor blades and the hub from the ground or the vessel to the top of the tower. In this case, the cover is advantageously detached from the aerodynamic device once the hub with the rotor blades is connected with the nacelle at the top of the tower.

As the cover has not only the effect of reducing the lift of the rotor blade by neutralizing the aerodynamic device but also to protect the aerodynamic device against damages during handling of the rotor blade, it may be advantageous to attach the cover to the rotor blade already before transporting the rotor blade to the installation site of the wind turbine. In other words, the cover may already be attached to the rotor blade at the factory site after manufacturing the rotor blade comprising the aerodynamic device such that the cover is already present when the rotor blade is transported from the manufacturing site to the installation site of the wind turbine.

In other words, the cover may already be attached to the rotor blade while the rotor blade is stored at a temporary storage site. Examples of such a temporary storage site are the factory site where the rotor blade is manufactured, another factory site which is different from the one where the rotor blade is manufactured or a port where the rotor blade is stored prior to transportation of the rotor blade to an offshore installation site of the wind turbine.

Regarding the step of detaching the cover from the rotor blade, there exist several ways of detaching it from the rotor blade once that the rotor blade is lifted to the top of the tower. One way is to pull the cover away by means of a string which is attached to the cover. This approach has the advantage that the cover is detached in a controlled way. Detaching the cover by pulling a string might be carried out just after service personnel has connected the rotor blade to the hub. This connection is often performed manually by service personnel.

For instance, the covered aerodynamic device may be located relatively close to the root of the rotor blade. Then, the string may be pre-arranged and lined up from the cover covering the aerodynamic device until the very root of the rotor blade. Thus, service personnel who is working at the hub and close to the root of the rotor blade may easily pull the string and detach the cover.

Another approach of detaching the cover from the rotor blade is by rotating the rotor with a rotor speed which is sufficiently high such that the cover flies off from the rotor blade by itself, namely by the centrifugal forces which occur during rotation of the rotor. This is a particularly easy and elegant method as the cover is detached by itself once that the wind turbine is brought into operation. However, it has to be taken care that the cover and especially the attachment of the cover on the rotor blade is carried out very carefully in order to correctly arrange the cover, such that at a predetermined rotational speed of the rotor the cover actually flies away reliably. It has also to be kept in mind that the cover then flies onto the ground or into the sea surrounding the wind turbine.

Embodiments of the invention are also directed towards an arrangement comprising a rotor blade of a wind turbine and a cover. The rotor blade comprises an aerodynamic device which is arranged at the surface of the rotor blade and the cover covers at least a part of the aerodynamic device such that airflow which flows across the aerodynamic device is deflected at the cover. The cover is configured and arranged such that the maximum lift coefficient of the arrangement is reduced compared to the maximum lift coefficient of the rotor blade during installation of the wind turbine. Finally, the cover is prepared to be detached from the rotor blade after installation of the wind turbine.

In other words, the cover is configured and arranged such that the maximum lift coefficient of the arrangement is reduced compared to the maximum lift coefficient of the rotor blade alone during installation of the wind turbine.

A key aspect is that the ensemble, i.e. the arrangement of the rotor blade comprising the aerodynamic device and the cover, is part of embodiments of the invention. The cover as such might be a standard device which is made of standard material—inexpensively and just adapted in shape and with regard to the forces that it has to withstand to the specific aerodynamic device which it is destined to cover.

The cover is configured and arranged such that the maximum lift coefficient of the arrangement is smaller than the maximum lift coefficient of the rotor blade alone.

In principle, any shape and design of the cover which fulfills this requirement of reducing the lift coefficient of the rotor blade is possible. In practice, a plurality of different shapes and designs are probable to fulfill this requirement. To give an example, at least a part of the cover may comprise a convexly-shaped outer surface. This shape has the advantage that it tends to deflect, i.e. deviate, the airflow in a favorable manner such that not only drag but also lift of the rotor blade are reduced. More particularly the cross-section of the cover has a substantially elliptical, in particular circular shape in the mounted state to the rotor blade. Note that this elliptical, in particular circular shape of the cross-section of the cover refers to a half ellipse or any fractions and parts of this ellipse. Designing a cover with an elliptical shape has the advantage that it is relatively easy to manufacture as this is a standard shape. Furthermore, even during design variation of the aerodynamic device, the overall shape of the cover is kept the same. This also facilitates and eases manufacturing of the cover.

Alternatively, the cover may also be designed in a way that a cross-section of the cover features a ramp, which extends away from the surface of the rotor blade with a substantially constant slope in an upstream section of the cover. In the example of a vortex generator to be covered, the vortex generator may have the shape and the design of a fin, featuring a slope going upward from an upstream end of the vortex generator a towards a downstream end of the vortex generator. In this case, the cover may, instead of an elliptical cross-section, also basically follow the cross-section of the vortex generator to be covered. This ensures a minimum exposure in a perpendicular direction away from the surface of the rotor blade and may also fulfill satisfactorily the aim of embodiments of the invention, namely the reduction of the lift coefficient of the rotor blade.

A first alternative of a material which may be used for the cover is a water-soluble material.

This has the advantage that for the case that the cover flies off the rotor blade by itself, i.e. by the centrifugal forces during rotation of the rotor, and the cover drops down and falls down on the ground or the sea which is surrounding the installation site of the wind turbine, the cover dissolves and does not remain in the surroundings for a long time.

Providing a cover with a water-soluble material also provides yet another approach for detaching the cover from the rotor blade. Having such a cover which is water-soluble, one also may just await the first rain or snow such falling on the rotor blade, such that the cover is washed away and hence gives free the aerodynamic device to the rotor blade.

Another option of a material for the cover is a foam material wherein the aerodynamic device is submerged into the foam material of the cover.

This has the advantage that on the one hand the cover is well attached to the aerodynamic device to be covered and on the other hand, a way of designing the cover is provided such that the cover projects away from the surface of the rotor blade as low as possible.

BRIEF DESCRIPTION

Some of the embodiments will be described in detail, with reference to the following figures, wherein like designations denote like members, wherein FIG. 1 shows a wind turbine;

FIG. 3 shows an airfoil of a rotor blade with a vortex generator;

FIG. 4 shows the same airfoil as in FIG. 3, covered by a cover for deflecting the air-flow flowing across the vortex generator;

Figure 6:
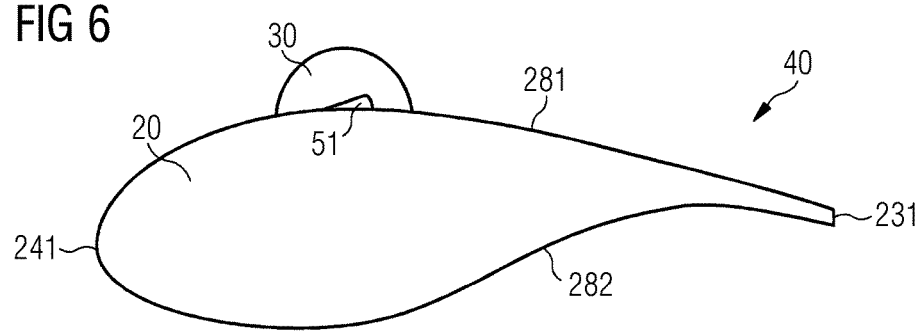
Figure 7:
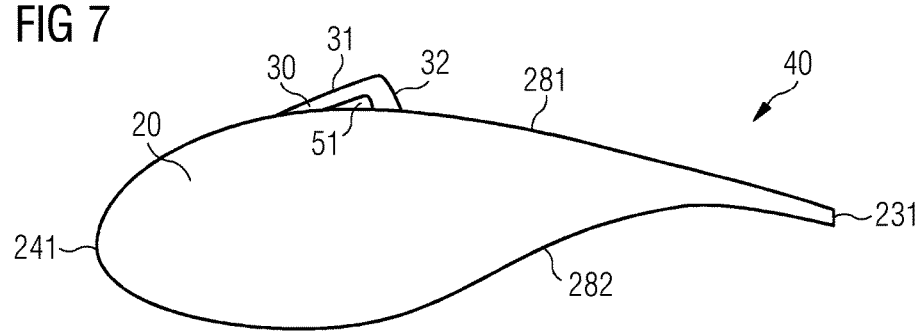
Figure 8:
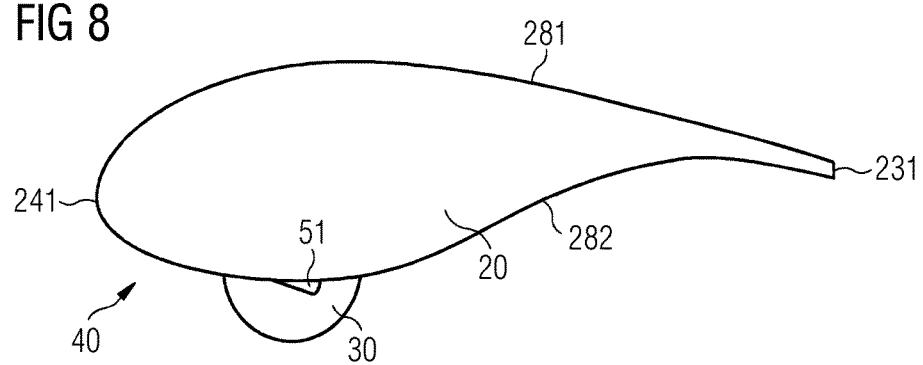
Figure 9:
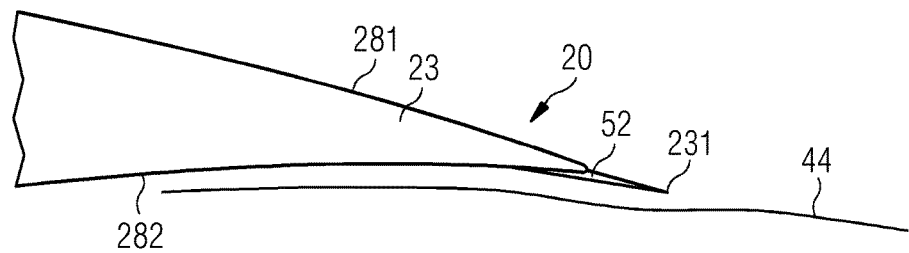
Figure 10:
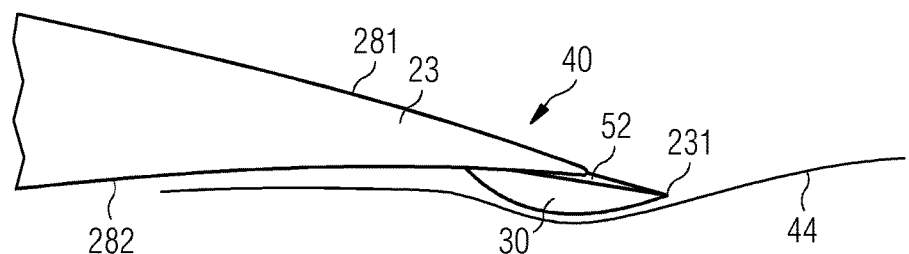
Figure 11:
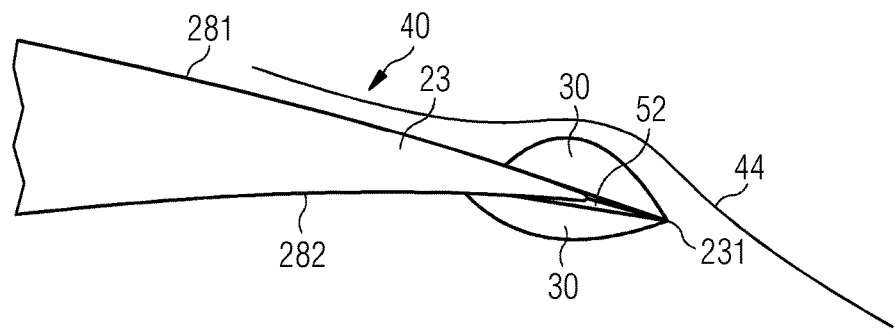

FIG. 5 graphically shows the impact of the cover on the lift coefficient of the airfoil;

FIG. 6 shows an embodiment of covering a vortex generator mounted to the surface of a rotor blade;

FIG. 7 shows an embodiment of covering a vortex generator mounted to the surface of a rotor blade;

FIG. 8 shows an embodiment of covering a vortex generator mounted to the surface of a rotor blade;

FIG. 9 shows a rotor blade with a noise reducer which is arranged at the trailing edge section of the rotor blade;

FIG. 10 shows a first embodiment of covering the noise reducer of FIG. 9;

FIG. 11 shows a second embodiment of covering the noise reducer of FIG. 9; and

Figure 12:
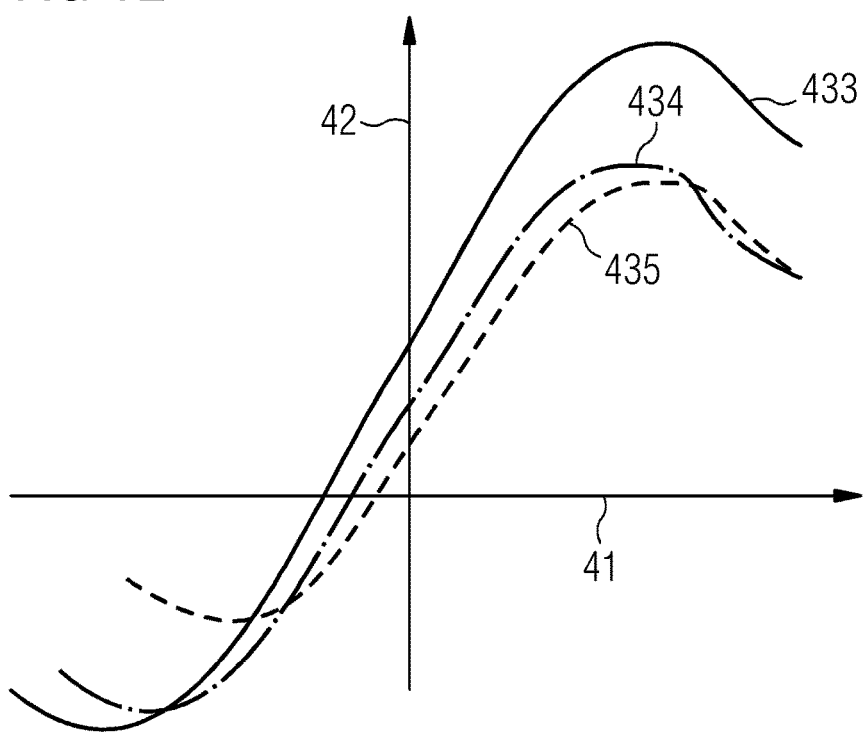

FIG. 12 graphically shows the impact of the different covers on the lift coefficient of the rotor blade.

The illustration in the drawings is schematic. Note that similar reference signs refer to similar or identical parts of the invention in different drawings.

DETAILED DESCRIPTION

Figure 1:
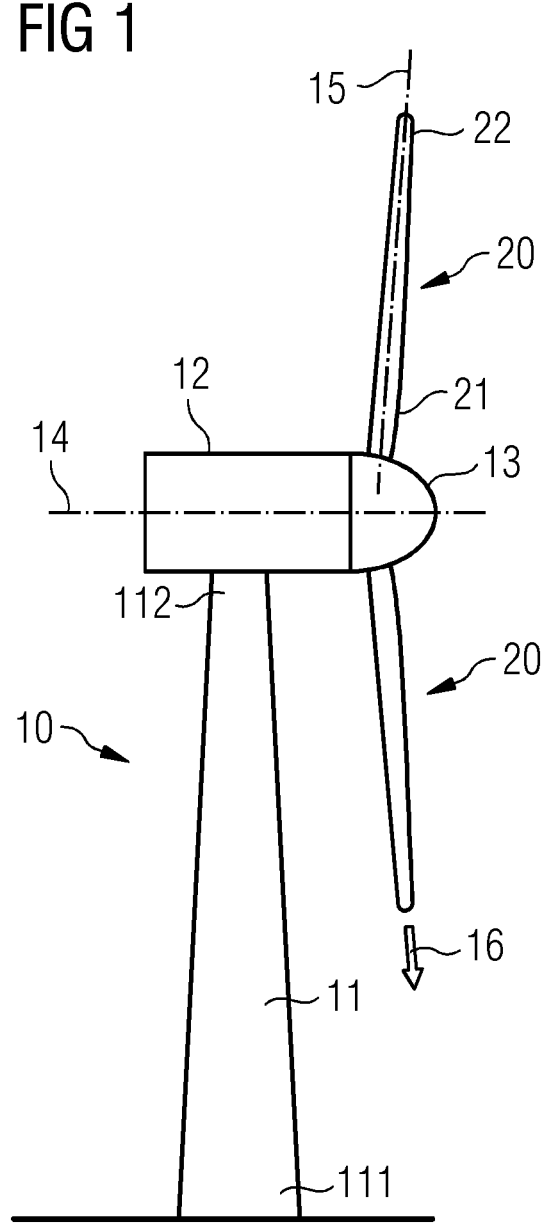

FIG. 1 shows a wind turbine 10. The wind turbine 10 comprises a tower 11 by which the wind turbine 10 is installed on the ground or at the sea. The tower 11 comprises a bottom 111 and a top 112. At the top 112 of the tower 11 a nacelle 12 is mounted rotatably. The nacelle 12 can be rotated about a substantially vertical axis, the so called yaw axis. The nacelle accommodates a generator for transforming rotational energy being provided by the rotor of the wind turbine into electrical energy. The wind turbine 10 furthermore comprises a rotor wherein the rotor axis 14 is slightly inclined from a horizontal orientation. One part of the rotor is the hub 13 of the wind turbine 10. The hub 13 is rotatably connected with regard to the nacelle 12. A plurality of rotor blades 20 are mounted to the hub 13. Each rotor blade 20 comprises a pitch axis 15 around which the rotor blade 20 can be rotated or at least pivoted with regard to the hub 13. During rotation of the rotor blades, centrifugal forces are generated and are directed into a direction 16 away from the hub 13 and along the pitch axis 15.

Figure 2:
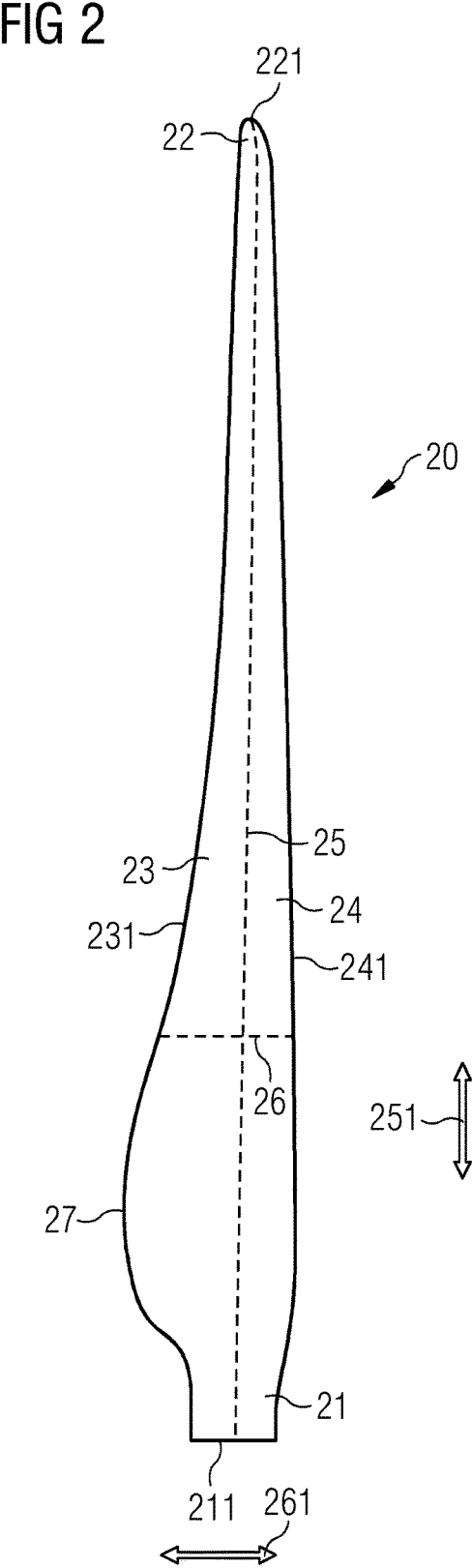
FIG. 2 shows a rotor blade of a wind turbine in a top view.

FIG. 2 shows a top view on a rotor blade 20. The rotor blade 20 comprises a root section 21 with a root 211 and a tip section 22 with a tip 221. Furthermore, the rotor blade 20 comprises a trailing edge section 23 with a trailing edge 231 and a leading edge section 24 with a leading edge 241. Furthermore, a virtual line connecting the root section 21 with a tip section 22 is referred to as the span 25 of the rotor blade 20. A set of further virtual lines are referred to as the chords 26 of the rotor blade 20. The span 25 and the chords 26 define the spanwise direction 251 and the chordwise directions 261 of the rotor blade 20, respectively. The length of the chord 26 is referred to as the chord length. The shoulder 27 of the rotor blade 20 is defined to be the position wherein the chord length is maximum.

FIG. 3 shows an airfoil of a rotor blade 20, i.e. it shows a cross-sectional view perpendicular to the span of the rotor blade. The leading edge 241 and the trailing edge 231 can be seen. The straight line which is connecting the trailing edge 231 and the leading edge 241 is referred to as the chord 26. The surface of the rotor blade, which is equivalent to the contour line of the airfoil, can be divided into a suction side 281 and a pressure side 282. In the example of FIG. 3, a vortex generator 51, which is an example of an aerodynamic device, is mounted and attached to the suction side 281 of the rotor blade 20. The technical effect of the vortex generator 51 is the generation of a vortex in the airflow 44, the airflow flowing from the leading edge section to the trailing edge section of the rotor blade. These vortices downstream of the vortex generator 51 have the effect of reenergizing the boundary layer downstream of the vortex generator 51. This delays stall of the airflow 44 and increases the lift coefficient of the airfoil. As lift and load are closely correlated, by covering the vortex generator 51 by a cover 30, as illustrated in FIG. 4, the vortex generator 51 is not effective anymore. In other words, a vortex generator covered by a cover deflects the airflow 44 differently compared to an uncovered vortex generator. This is due to the fact that the vortex generators 51 which are typically mounted in pairs are not active once that they are completely or almost completely covered. Therefore, lift and also load on the rotor blade is reduced.

This is valid for the case that the airflow 44 is flowing from the leading edge section to the trailing edge section, but is also valid if the airflow 44 comes from another direction and flows across the aerodynamic device differently. In any case, covering a lift generating device such as a vortex generator may have a beneficial effect regarding load reduction of the arrangement comprising the rotor blade and the cover.

FIG. 4 shows a cover 30 which more or less imitates or follows the shape of the aerodynamic device to be covered. In other words, in the example of FIG. 4, the cover has a ramp wherein a substantially constant slope can be discerned in the direction of the airflow 44 until the top of the vortex generator 51. Subsequently and suddenly, the contour line of the cover decreases towards the surface of the rotor blade.

However, the cover 30 may also have different shapes such as, for instance, shown in FIGS. 6 and 7. In FIG. 6, the cover 30 has a substantially elliptical shape, thus covering generously the vortex generator 51. As another example, FIG. 7 again shows a ramp-like cover 30 with an upstream section of the cover, now followed by an almost constant slope and an irregular downstream section 32 of the cover 30.

Note that, in principle, any aerodynamic device may be covered by the cover according to embodiments of the present invention. FIG. 8, for example, shows a vortex generator 51 which is mounted to the pressure side instead of the suction side of a rotor blade. Again, similar to FIG. 6, the cover has an elliptical shape in the cross-sectional view of FIG. 8.

Back to the general concept of embodiments of the present invention, FIG. 5 shows the impact of a cover on the lift coefficient of the airfoil. In FIG. 5, a lift curve 431 of a rotor blade with an uncovered vortex generator is compared with the lift curve 432 of a rotor blade with a covered vortex generator. The rotor blade with the covered vortex generator is also referred to as a "first arrangement" in the following.

The first arrangement refers to an arrangement as illustrated in FIG. 4. The lift curve 431 refers to a rotor blade such as illustrated in FIG. 3. It can be seen that for small and medium size angles of attack 41, the lift coefficient 42 is almost the same. However, for higher angles of attack 41, the lift coefficient of the first arrangement 432 is considerably reduced compared to the lift coefficient of the rotor blade with the uncovered vortex generator. As the maximum lift coefficient is closely related to the maximum load on the rotor blade and the wind turbine, reduction of this maximum lift coefficient is beneficially in terms of maximum loads which are supported by the rotor blade.

FIG. 9 shows a noise reducer 52 which is arranged at the trailing edge section 23 of a rotor blade. Note that the furthest downstream point of the airfoil represents the trailing edge 231 of the airfoil. The noise reducer 52 is attached to the pressure side 282 of the rotor blade. It may comprise just a standard flap or a serrated flap which is also referred to as trailing edge serrations or DinoTail. The lift curve of the rotor blade with the noise reducer is shown as the curve 433 in FIG. 12. The airflow 44 which flows along the pressure side 282 of the rotor blade is shown in FIG. 9.

FIG. 10 and FIG. 11 show two embodiments of a cover 30 covering a noise reducer 52. In the first option (FIG. 10), the cover 30 only covers the pressure side part of the noise reducer 52, while in the second option (FIG. 11), the cover 30 consists of two parts, one part covering the suction side of the noise reducer 52 and one part covering the pressure side of the noise reducer 52.

The effect on the lift coefficient of these two arrangements, namely the first arrangement referring to a cover in FIG. 10 and the second arrangement referring to the cover in FIG. 11 are illustrated in FIG. 12. Both lift curves 434 and 435 are considerably shifted and reduced compared to the lift curve with the rotor blade and the uncovered airflow 44. This is due to the fact that also the airflow 44 is considerably deflected, in other words deviated, compared to the uncovered scenario as illustrated in FIG. 9. Therefore, it can be seen that by providing a cover 30 covering at least a part of an aerodynamic device, a reduction of the maximum lift coefficient can be achieved. Consequently, a reduction of the load on the rotor blade and the wind turbine as a whole can be achieved. This in turn ultimately allows installation of the wind turbine, in particular lifting of the rotor blades to the top of tower, at even higher wind speeds compared to rotor blades with uncovered aerodynamic devices.

The invention claimed is:

1. A method of reducing a load of a rotor blade of a wind turbine during installation of the wind turbine, wherein the rotor blade comprises an aerodynamic device arranged at a surface of the rotor blade, of the method comprising:
attaching a cover on the rotor blade such that at least a part of the aerodynamic device is covered by the cover;
lifting the rotor blade to a top of a tower of the wind turbine; and
detaching the cover from the rotor blade, wherein detaching the cover from the rotor blade comprises rotating the rotor with a rotor speed being high enough such that the cover flies off due to the centrifugal force acting on the cover during rotation of the rotor blade.

2. The method according to claim 1 further comprising mounting the rotor blade to a hub of the wind turbine after lifting the rotor blade to the top of the tower of the wind turbine.

3. The method according to claim 1, wherein attaching the cover to the rotor blade is carried out before transporting the rotor blade to an installation site of the wind turbine.

4. The method according to claim 1, wherein the rotor blade is stored at a temporary storage site after attaching the cover to the rotor blade and before lifting the rotor blade to the top of the tower.

5. The method according to claim 1, wherein detaching the cover from the rotor blade comprises pulling the cover away by means of a string which is attached to the cover.

6. An arrangement comprising:
a rotor blade of a wind turbine and a cover, wherein the rotor blade comprises an aerodynamic device arranged at a surface of the rotor blade, the cover covering at least a part of the aerodynamic device such that airflow which flows across the aerodynamic device is deflected at the cover,
wherein the cover is configured and arranged such that a maximum lift coefficient of the arrangement is reduced compared to a maximum lift coefficient of the rotor blade during installation of the wind turbine,
wherein the cover is prepared to be detached from the rotor blade after installation of the wind turbine;
wherein the cover is made of a water soluble material.

7. The arrangement according to claim 6, wherein the aerodynamic device is a vortex generator.

8. The arrangement according to claim 6, wherein the aerodynamic device is a noise reducer which is arranged at a trailing edge section of the rotor blade.

9. The arrangement according to claim 6, wherein the aerodynamic device is a flap for modifying the lift coefficient of the rotor blade.

10. The arrangement according to claim 6, wherein at least a part of the cover comprises a convexly shaped outer surface.

11. The arrangement according to claim 6, wherein a cross-section of the cover has a substantially elliptical shape in a mounted state to the rotor blade.

12. The arrangement according to claim 6, wherein a cross-section of the cover is shaped as a ramp away from the surface of the rotor blade with a substantially constant slope in an upstream section of the cover.

13. The arrangement according to claim 6, wherein the cover is made of a foam material, and the aerodynamic device is submerged into a foam material of the cover.

14. The method of claim 1, wherein the aerodynamic device is a vortex generator, a noise reducer, or a flap.

15. An arrangement comprising:
a rotor blade of a wind turbine and a cover, wherein the rotor blade comprises an aerodynamic device arranged at a surface of the rotor blade, the cover covering at least a part of the aerodynamic device such that airflow which flows across the aerodynamic device is deflected at the cover,
wherein the cover is configured and arranged such that a maximum lift coefficient of the arrangement is reduced compared to a maximum lift coefficient of the rotor blade during installation of the wind turbine,
wherein the cover is prepared to be detached from the rotor blade after installation of the wind turbine;
wherein the cover is made of a foam material, and the aerodynamic device is submerged into a foam material of the cover.

16. The arrangement according to claim 15, wherein the aerodynamic device is a vortex generator.

17. The arrangement according to claim 15, wherein the aerodynamic device is a noise reducer which is arranged at a trailing edge section of the rotor blade.

18. The arrangement according to claim 15, wherein the aerodynamic device is a flap for modifying the lift coefficient of the rotor blade.

\* \* \* \* \*